United States Patent [19]

McClain

[11] Patent Number: 4,951,998
[45] Date of Patent: Aug. 28, 1990

[54] AUTOMOBILE HEADREST

[76] Inventor: Bill McClain, 10905 Curtis Plaza, Omaha, Nebr. 68164

[21] Appl. No.: 419,387

[22] Filed: Oct. 10, 1989

[51] Int. Cl.[5] ............................................. A47C 7/38
[52] U.S. Cl. ..................................... 297/395; 5/437; 296/152; 248/118; 297/391
[58] Field of Search ..................... 297/391, 395; 5/434, 5/436, 437; 248/118; 296/152; 280/748, 751

[56] References Cited

U.S. PATENT DOCUMENTS

| | | | |
|---|---|---|---|
| 1,787,832 | 1/1931 | Mueller | 297/391 |
| 1,855,408 | 4/1932 | Montenegio | 297/395 |
| 2,983,310 | 5/1961 | Warlick et al. | |
| 3,220,770 | 11/1965 | Schaeffer | 297/395 |
| 3,608,964 | 9/1971 | Earl | 297/397 |
| 3,851,919 | 12/1974 | Nagy | 297/395 |
| 4,770,466 | 9/1983 | Pesterfield | 297/391 |

*Primary Examiner*—Peter R. Brown
*Attorney, Agent, or Firm*—Andsel Group, Inc.

[57] ABSTRACT

An automobile head rest assembled from two elongated pillow sections flexibly attached to each other to provide a longitudinal head rest that can be bent ay any desired angle. A support cord extending longitudinally along the top edge of the two pillow sections culminating on each end in a slidable support ring and a suction cup. The suction cup easily attached to any smooth surface such as the automobile window.

1 Claim, 1 Drawing Sheet

AUTOMOBILE HEADREST

BACKGROUND OF THE INVENTION

1. Field of the Invention

The instant invention relates to headrests of pillows for use in automobiles. The headrests are configured to support the head in the corner formed by the automobile side window and the top of the passenger seat.

2. Description of the Prior Art

Automobile headrests are old in the prior art. U.S. Pat. No. 2,983,310 Warlick et al discloses a cushion that can be adjusted to many different positions relative to the supporting means. The cushion is supported by a clamp member secured to the upper portion of a seat back. U.S. Pat. No. 3,851,919 Hagg discloses a pillow unit adjustably secured to a bracket hooked at an end to the top edge of the automobile window. U.S. Pat. No. 3,608,964 discloses a pillow unit attachable to the back of the seat by means of VELCRO patches.

SUMMARY OF THE INVENTION

The instant invention describes a passenger headrest comprising elongated pillow sections joined in tandem. The joining portion providing means for bending the two sections at any desired angle. Support cords attached along the top edge of the joined pillows and extending a distance from the pillows having a ring and a suction cup attached to the extended ends. The ring and suction providing a wide range of adjustments for securing the headrest. The suction allowing attachment to any smooth surface such as a window. The ring can be slipped over the vehicle garment hook.

DETAILED DESCRIPTION OF THE PREFERRED EMBODIMENTS

Figure 1:
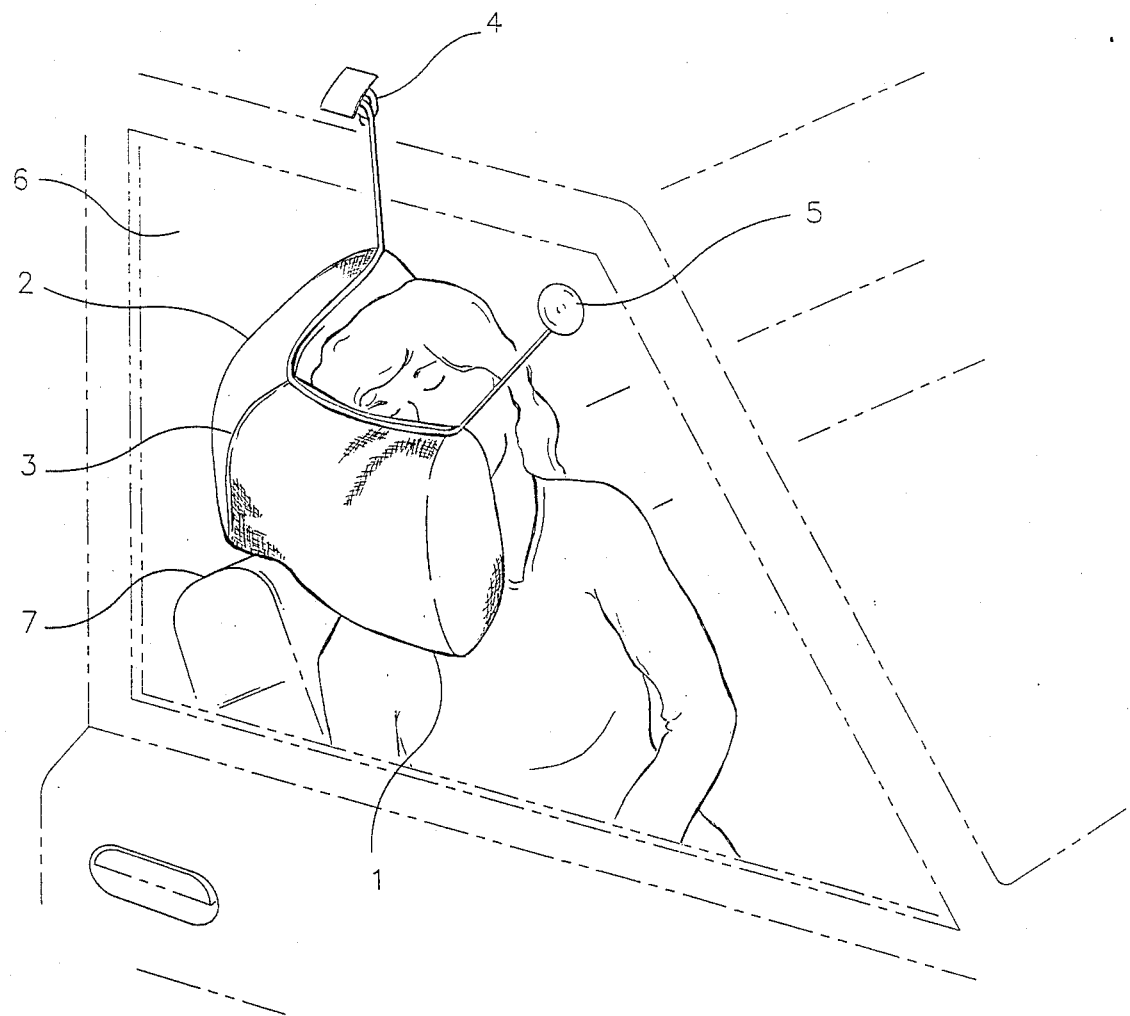
FIG. 1 is a side top perspective view of the automobile head rest with one end of the support cord fastened to the car window by means of the suction cup. The other end of the support cord fastened to the garment hook.

Referring to FIG. 1 pillow sections 1 and 2 joined at common edge 3 are shown cradling a passenger head in a corner arrangement between the automobile window 6 and the seat head rest 7 by means of the suction cup 5 fastened to the window surface securing the left edge of the headrest. The right edge of the headrest fastened to the automobile garment hook.

Figure 2:
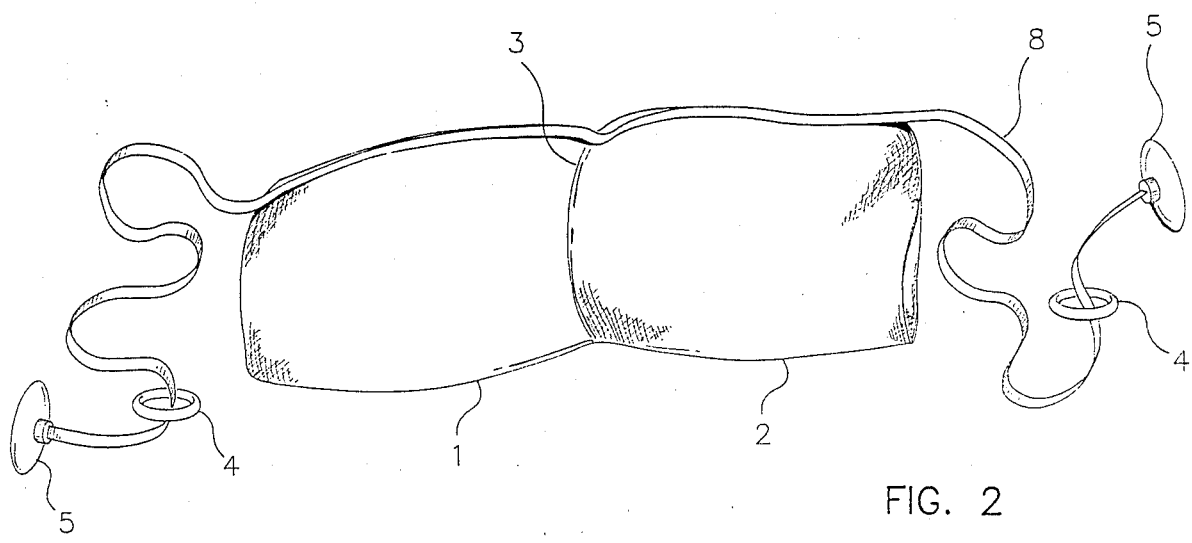
FIG. 2 is a front view of the automobile head rest.

The front view of the headrest shown in FIG. 2 shows the left pillow portion 1 flexibly attached at 3 to the right pillow portion 2. The support cord 8 extending along the top edge of both pillows culminating in a suction cup 5 and support ring 4 on each end.

I claim:

1. An automobile headrest of two pillow sections flexibly joined at the center wherein the improvement comprises:
   (a) the two elongated pillow sections flexibly joined in tandem;
   (b) the pillow sections having an outside cover of fabric or plastic;
   (c) the pillow sections filled with a suitable resilient filler material;
   (d) a pliable, flexible support cord fastened longitudinally along the top edge of the pillow sections;
   (e) the support cord extending some distance beyond the outside ends, of the joined pillow sections; and,
   (f) each end of the support cord passing through a slidable attached support ring to attach to a suction cup.

* * * * *